United States Patent
Lu et al.

(10) Patent No.: US 9,948,469 B2
(45) Date of Patent: Apr. 17, 2018

(54) METHOD FOR IDENTIFYING AUDIO DEVICE

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 147 days.

(21) Appl. No.: 15/107,116

(22) PCT Filed: Jan. 16, 2015

(86) PCT No.: PCT/CN2015/070828
§ 371 (c)(1),
(2) Date: Jun. 22, 2016

(87) PCT Pub. No.: WO2015/106708
PCT Pub. Date: Jul. 23, 2015

(65) Prior Publication Data
US 2018/0062862 A1     Mar. 1, 2018

(30) Foreign Application Priority Data

Jan. 20, 2014 (CN) .......................... 2014 1 0023727

(51) Int. Cl.
*H04M 1/00* (2006.01)
*H04L 9/32* (2006.01)
(Continued)

(52) U.S. Cl.
CPC ........ *H04L 9/3271* (2013.01); *H04M 1/6041* (2013.01); *H04M 1/6066* (2013.01);
(Continued)

(58) Field of Classification Search
CPC .............. H04L 9/3271; H04L 2209/80; H04M 1/6041; H04M 1/6066; H04M 1/7253;
(Continued)

(56) References Cited

U.S. PATENT DOCUMENTS 8,208,917 B2 *   6/2012   Ueda ................... H04M 1/6066
                                                    455/420
9,886,941 B2 *   2/2018   Baym .................... G10K 11/26
(Continued)

*Primary Examiner* — Nhan Le
(74) *Attorney, Agent, or Firm* — Hammer & Associates, P.C.

(57) ABSTRACT

A method for identifying an audio device, in which a mobile device starts to monitor pull out or insert of an audio device, when the mobile device connects the audio device, the mobile device starts to record, the audio device is identified as an audio smart key device in the case that characteristic data is received in a first preset time, and data is sent to the audio smart key device; turns off recording in the case that the characteristic data is not received in the first preset time; the audio smart key device is powered on and initialized, it sends audio data to the mobile device, subsequently, if the audio smart key device receives data sent from the mobile device in a second preset time, it processes the data; if the audio smart key device does not receive the data sent from the mobile device, the audio smart key device turns off; when the mobile device disconnects the audio device, the mobile device turns off recording and the audio device turns off. According to the present invention, a mobile device can identify a type of an audio device which is inserted into the mobile device, the mobile device sends data after ensuring that the audio device is an audio smart key device, thus, the method can prevent from any noise in the earphone, so the users can feel better.

20 Claims, 7 Drawing Sheets

(51) Int. Cl.
*H04M 1/60* (2006.01)
*H04M 1/725* (2006.01)
*H04W 12/06* (2009.01)
*H04W 88/02* (2009.01)

(52) U.S. Cl.
CPC ....... *H04L 2209/80* (2013.01); *H04M 1/7253* (2013.01); *H04W 12/06* (2013.01); *H04W 88/02* (2013.01)

(58) Field of Classification Search
CPC ......... H04M 1/72522; H04M 1/72527; H04W 12/06; H04W 88/02
USPC ............. 455/550.1, 556.1, 575.1, 90.1, 90.3, 455/67.11, 67.13, 114.2
See application file for complete search history.

(56) References Cited

U.S. PATENT DOCUMENTS

| | | | |
|---|---|---|---|
| 2008/0096603 A1* | 4/2008 | Sparre | G06Q 20/102 455/550.1 |
| 2009/0197640 A1 | 8/2009 | Fa et al. | |
| 2011/0136541 A1* | 6/2011 | Chang | H04M 1/72527 455/558 |

* cited by examiner

METHOD FOR IDENTIFYING AUDIO DEVICE

FIELD OF THE INVENTION

The present invention relates to a method for identifying an audio device, which belongs to the field of information security.

PRIOR ART

An audio device is a generic term of devices which input or output audio frequency. There are many types of audio devices, such as earphones and audio smart key devices. An audio smart key device is a smart key device with earphone interface, which can send audio data to a mobile device connected to the audio smart key device; and an audio smart key device has a microphone.

In prior art, when detecting that an audio device is inserted in it, a mobile device sends audio data to the audio device, but if an earphone is inserted in a mobile device, the audio data bring with noise to the earphone so as to effect auditory sense of users, thus, users will feel bad.

SUMMARY OF THE INVENTION

The object of the present invention is to provide a method for identifying an audio device, in which a mobile device can identify a type of a audio device which is inserted in the mobile device; after determining that the audio device is an audio smart key device, the mobile device sends data, in this way, users feel good because noise is prevent when an earphone is inserted in the mobile device.

Thus, the present invention provides a method for identifying an audio device, which applies to a system including a mobile device and an audio device; the method includes that the mobile device starts a thread of monitoring pull out or insert of an audio device to monitor pull out or insert of the audio device;

when the mobile device connects an audio device, the mobile device operating following steps:

Step S1, starting, by the mobile device, to record, when the mobile device monitors that an audio device is inserted in it;

Step S2, determining, by the mobile device, whether audio data received in a first preset time is characteristic data, if yes, executing Step S4; if no, executing Step S3;

Step S3, turning off, by the mobile device, recording, ending; Step S4, identifying, by the mobile device, the inserted audio device as an audio smart key device; and Step S5, sending, by the mobile device, data to the audio smart key device;

when the audio smart key device connects the mobile device, the audio smart key device executing following steps:

Step T1, the audio smart key device powering on and initializing;

Step T2, sending, by the audio smart key device, audio data to the mobile device;

Step T3, determining, by the audio smart key device, whether data sent by the mobile device is received in a second preset time, if yes, executing Step T4; if no, the audio smart key device turning off; and Step T4, processing, by the audio smart key device, the data sent by the mobile device.

Preferably, when the mobile device monitors that an audio device is pulled out, the mobile device turns off recording, the process is end; the audio device is turned off.

Preferably, Step S1 specifically is: the mobile device allocating a recording storage area, invoking a recording function, introducing a head address in the recording storage area into the recording function, and starting to record.

Preferably, after Step S1, the method further including:

Step a1, monitoring, by the mobile device, a length of the audio data received by the recording storage area at per preset duration, and determining whether the length reaches a first preset length, if yes, saving the received audio data of the first preset length, and executing Step S2; otherwise, executing Step a2; and Step a2, determining, by the mobile device, whether recording time reaches the first preset time, if yes, saving the received audio data in the recording storage area, and executing Step S2; otherwise, returning to Step a1.

Preferably, after Step S1, the method further includes:

Step b1, monitoring, by the mobile device, the length of the audio data received by the recording storage area at per preset duration, and determining whether the length reaches the first preset length, if yes, executing Step b2; otherwise, executing Step b3;

Step b2, saving, by the mobile device, the received audio data of the first preset length; and Step b3, determining, by the mobile device, whether a length of the received audio data which is saved reaches a second preset length, if yes, executing Step S2; otherwise, returning to Step b1.

Preferably, after Step S1, the method further includes:

Step c1, obtaining, by the mobile device, the audio data received by the recording storage area at every preset duration, and saving the received audio data; and Step c2, determining, by the mobile device, whether recording time reaches the first preset time, if yes, executing Step S2; otherwise, executing Step c1.

Preferably, after Step S1, the method further includes:

Step d1, monitoring, by the mobile device, the length of the audio data received by the recording storage area at every preset duration, and determining whether the length reaches the first preset length, if yes, executing Step d2; otherwise, executing Step d3;

Step d2, saving, by the mobile device, the received audio data of the first preset length; and Step d3, determining, by the mobile device, whether the recording time reaches the first preset time, if yes, executing Step S2; otherwise, executing Step d1.

Preferably, Step S2 specifically includes:

Step e1, parsing, by the mobile device, the received audio data so as to obtain parsed data, determining whether there exists data which meets a preset data form in the parsed data, if yes, executing Step e2; otherwise, the characteristic data is not received, clearing the received data and executing Step S3; and Step e2, determining, by the mobile device, whether the number of data which meets the preset data form reaches a preset number, if yes, the characteristic data is received, executing Step S4; otherwise, the characteristic data is not received, executing Step S3.

Preferably, Step e1 and Step e2 specifically includes:

Step f1, resetting, by the mobile device, a current count value, and making a first group of data in the parsed data as a current data group;

Step f2, determining, by the mobile device, whether the current data group meets the preset data form, if yes, executing Step f3; otherwise, executing Step f4;

Step f3, updating, by the mobile device, the current count value, determining whether the current count value reaches the preset number, if yes, the characteristic data is received, executing Step S4; otherwise, executing Step f4; and Step f4, determining, by the mobile device, whether there exists unprocessed data group in the parsed data, if yes, making a next data group as the current data group, and executing Step f2; otherwise, the characteristic data is not received, clearing the received data, and executing Step S3.

Preferably, saving the received audio data specifically is: saving the received audio data in a data storage area, and deleting the received audio data from the recording storage area.

Preferably, parsing the received audio data so as to obtain parsed data specifically is that the received data is filtered, blocked, low-pass filtered and transferred so as to obtain parsed data.

Preferably, in Step e2, when the number of data which meets the preset data form reaches the preset number, the method further includes:

Step g1, obtaining, by the mobile device, buffering data from the parsed data;

Step g2, obtaining, by the mobile device, a valid data segment from the parsed data according to the buffering data, decoding the valid data segment so as to obtain decoded data; and Step g3, determining, by the mobile device, whether the decoded data is preset data, if yes, the mobile device receiving the characteristic data, and executing Step S4; otherwise, the mobile device dose not receive the characteristic data, and executing Step S3.

Preferably, in Step T1, powering on the audio smart key device specifically includes: the audio smart key device powering on when the audio smart key device detects it connects to the mobile device.

Preferably, in Step T1, powering on the audio smart key device specifically includes: the audio smart key device powering on when the Start key in the audio smart key device is pressed.

Preferably, Step T2 specifically includes: the audio smart key device making the preset number of data of preset data form as a data package, coding the data package so as to obtain a coded data package, sending the coded data package to the mobile device via an audio interface according to a preset sampling frequency, a preset sampling size and a preset channel.

Preferably, Step T2 specifically includes: obtaining, by the audio smart key device, the preset data, coding the preset data so as to obtain a valid data segment; composing the preset number of data of preset data form, buffering data and the valid data segment into a data package; coding the data package so as to obtain a coded data package, and sending the coded data package to the mobile device according to the preset sampling frequency, the preset sampling size and the preset channel via an audio interface.

Preferably, the method further includes: the mobile device receiving data according to the preset sampling frequency, the preset sampling size and the preset channel.

Preferably, Step S5 specifically includes:

Step h1, generating, by the mobile device, a handshake instruction according to handshake data stored in the mobile device, and sending the handshake instruction to the audio smart key device;

Step h2, waiting for, by the mobile device, receiving a handshake response returned by the audio smart key device, parsing the handshake response when the handshake response is received so as to obtain handshake data in the handshake response; and Step h3, determining, by the mobile device, whether the handshake data in the handshake instruction matches the handshake data stored in the mobile device, if yes, the handshake is successful; otherwise, the handshake is unsuccessful.

Preferably, Step T4 specifically includes:

Step i1, receiving, by the audio smart key device, handshake instruction sent by the mobile device, and parsing the handshake instruction so as to obtain handshake data in the handshake instruction;

Step i2, determining, by the audio smart key device, whether the handshake data in the handshake instruction matches the handshake data stored in the audio device, if yes, executing Step i3; otherwise, returning to execute Step T3; and Step i3, generating, by the audio smart key device, a handshake response according to the handshake data stored in the audio device, and returning the handshake response to the mobile device.

Preferably, Step S5 further includes:

Step j1, waiting, by the mobile device, for receiving PIN code entered by a user, sending an instruction of verifying PIN code to the audio smart key device when PIN code entered by the user is received; and Step j2, waiting, by the mobile device, for receiving a response of verifying PIN code returned by the audio smart key device, determining whether the PIN code is verified successfully when the response of verifying PIN code is received, if yes, prompting that the PIN code is verified successfully; otherwise, returning to Step j1, Step T4 further including: the audio smart key device determining whether the PIN code in the instruction of verifying PIN code matches the PIN code stored in the audio smart key device after the audio smart key device receives the instruction of verifying PIN code sent by the mobile device, if yes, returning a response of verifying PIN code that the PIN code is verified successfully, and returning to Step T3; otherwise, returning a response that the PIN code is verified unsuccessfully, and returning to Step T3.

Preferably, Step S5 further includes:

Step k1, organizing, by the mobile device, data which is to be signed, and sending a signature instruction which includes the data to be signed to the audio smart key device; and Step k2, the mobile device waiting for receiving a signature response returned by the audio smart key device, and determining whether the signature is successful, if yes, prompting that the signature is successful; otherwise, prompting that the signature is unsuccessful.

Preferably, Step T4 further includes: the audio smart key device applying a preset signature algorithm to sign the data to be signed in the signature instruction after the audio smart key device receives the signature instruction sent by the mobile device, determining whether the audio smart key device can sign the data successfully, if yes, obtaining signed data, and generating a signature response that the audio smart key device signs the data successfully according to the signed data, and returning the signature response to the mobile device; otherwise, generating a signature response that the audio smart key device signs the data unsuccessfully, and returning the signature response to the mobile device.

Preferably, when the PIN code entered by a user is received, Step j1 further includes: the mobile device obtaining a first instruction data according to the PIN code entered by the user and preset data, coding the first instruction data so as to obtain an instruction of verifying PIN code.

Preferably, when the instruction of verifying PIN code sent by the mobile device is received, the method further includes: the audio smart key device parsing the instruction of verifying PIN code so as to obtain a first parsed data, determining whether the first parsed data includes the preset data, if yes, obtaining a first data behind the preset data from the first parsed data, and decoding the first data so as to obtain the PIN code from the instruction of verifying PIN code; otherwise, sending a response of verifying PIN code that the instruction is wrong to the mobile device.

Preferably, organizing the data which is to be signed specifically includes: the mobile device waiting the user to press Enter key, and organizing the data which is to be signed according to the user's identity information when the Enter key is pressed.

Preferably, sending the signature instruction which includes the data to be signed to the audio smart key device specifically including: the mobile device obtaining a second instruction data according to the data to be signed and the preset data, coding the second instruction data so as to a signed instruction.

Preferably, after the signature instruction sent by the mobile device is received, the method further including: the audio smart key device parsing the signature instruction so as to obtain a second parsed data, determining whether the second parsed data includes the preset data, if yes, obtaining a second data after the preset data from the second parsed data, and decoding the second data so as to obtain the data to be signed in the signature instruction; otherwise, sending a signature response that the instruction is wrong to the mobile device.

Preferably, after the audio device receives the signature instruction, Step k5 further includes: the audio smart key device displaying the data to be signed, and determining whether the Enter key is pressed in a third preset time, if yes, applying the preset signature algorithm to sign the data to be signed in the signature instruction; otherwise, returning a signature response of time-out to the mobile device.

Preferably, after the mobile device monitors that an audio device is inserted in, the method further includes: the mobile device determining whether there exists a microphone in the audio device, if yes, starting to record; otherwise, going on monitoring the pull out or insert of an audio device.

According to the present invention, a mobile device can identify a type of an audio device which is inserted into the mobile device, the mobile device sends data after ensuring that the audio device is an audio smart key device, thus, the method can prevent from any noise in the earphone, so the users can feel better.

BRIEF DESCRIPTION OF THE DRAWINGS

The Embodiments of the present invention are further described more clearly and completely with the drawing in the Embodiments of the present invention. Obviously, Embodiments described here are just a few Embodiments of the present invention, when it comes to those skilled in the art, other drawings can be obtained without inventive work.

EMBODIMENTS OF THE INVENTION

The technical solution in the Embodiments of the present invention is further described more clearly and completely with the drawings in the Embodiments of the present invention. Apparently, Embodiments described are just a few Embodiments of the present invention. On the basis of Embodiments of the invention, all other related Embodiments made by those skilled in the art without inventive work belong to the scope of the invention.

The technical solution can be applied in a system which includes a mobile device and an audio device; the mobile device processes audio data sent from the audio device, ensures that the audio device is an audio smart key device according to characteristic data in the audio data, subsequently, the mobile device sends an instruction to the audio smart key device, and the audio smart key device operates corresponding operation according to the received instruction.

Embodiment 1

Figure 1:
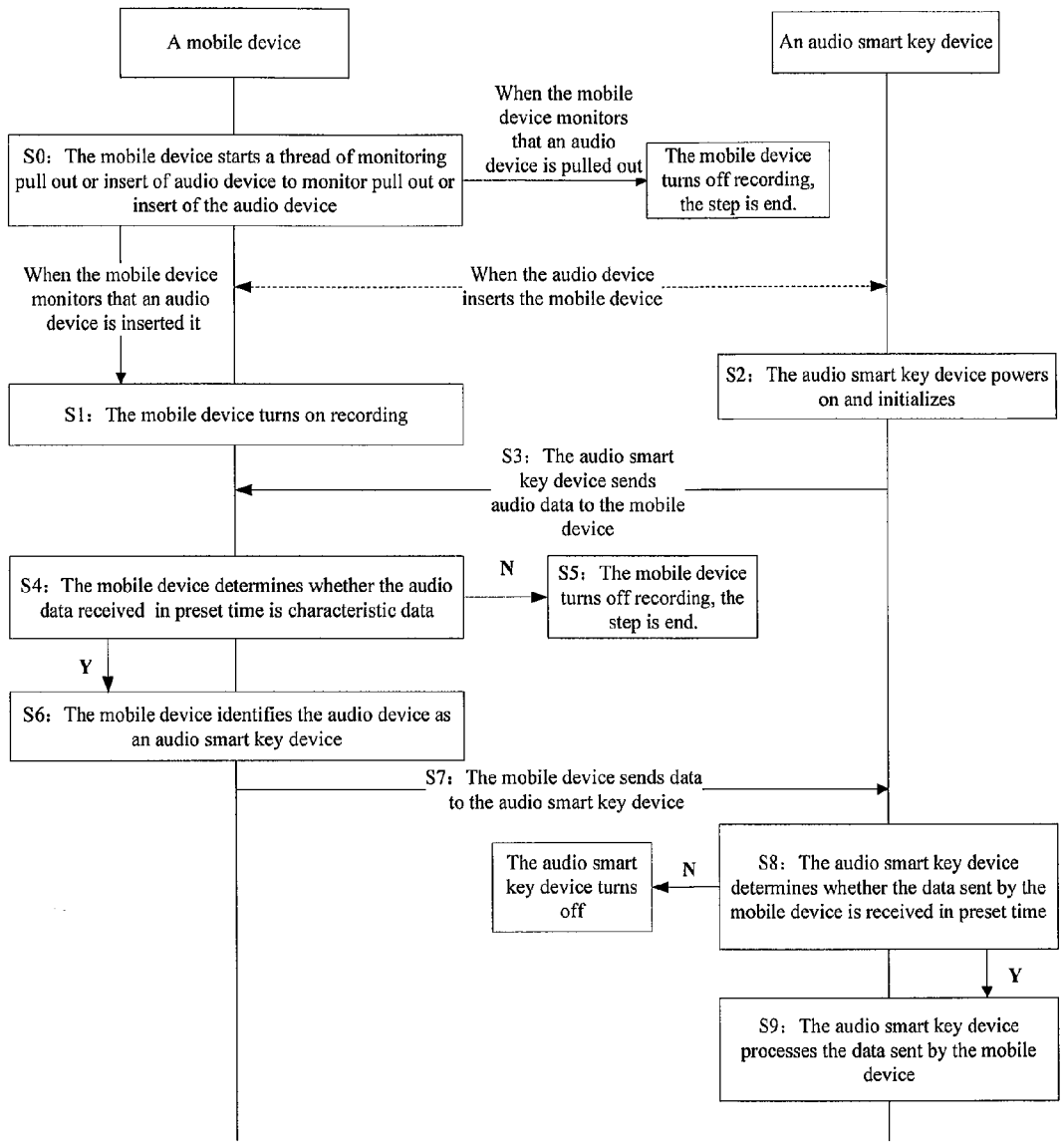
FIGS. 1-3 are a method flow chart of identifying an audio device according to Embodiment 1 of the present invention.
Figure 2:
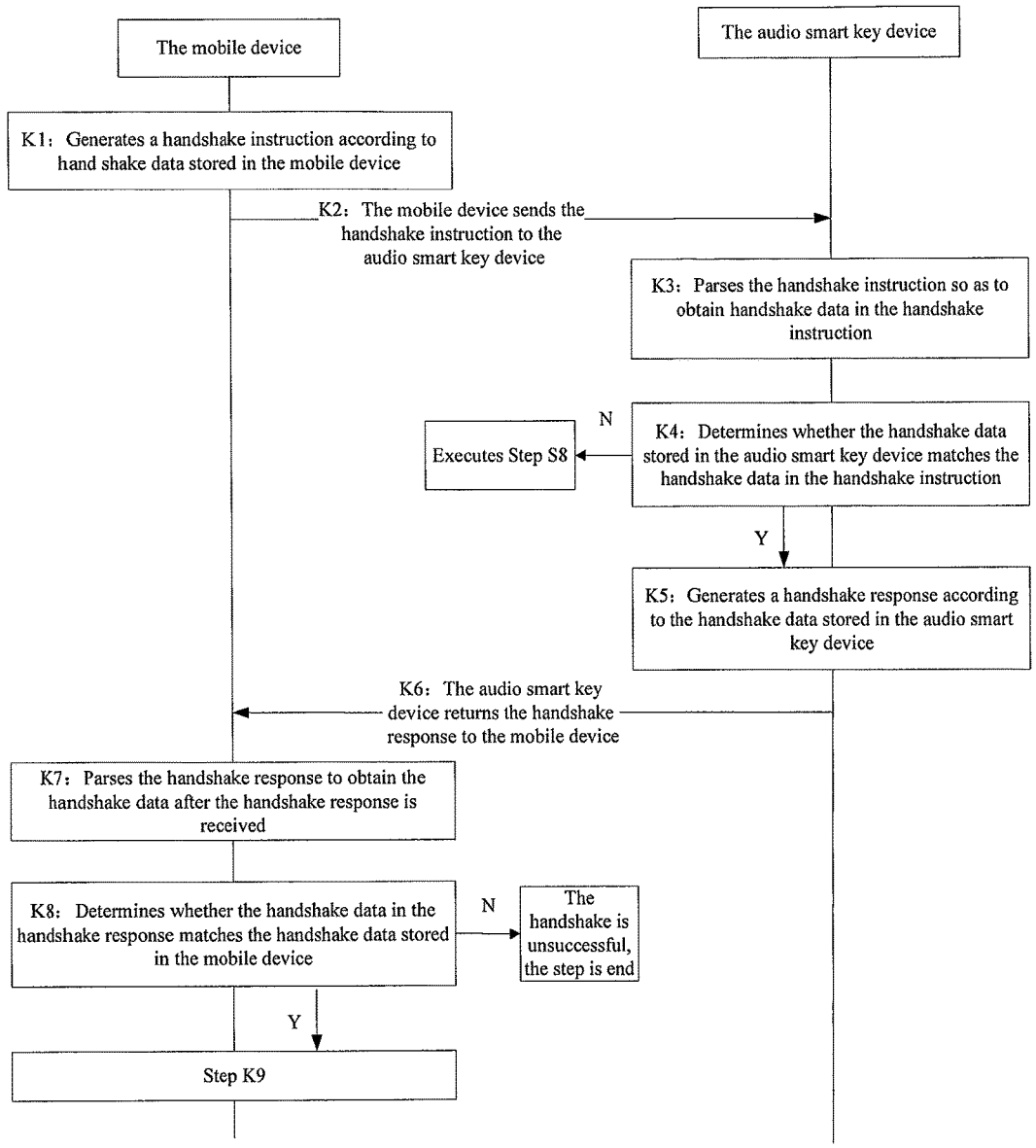
Figure 3:
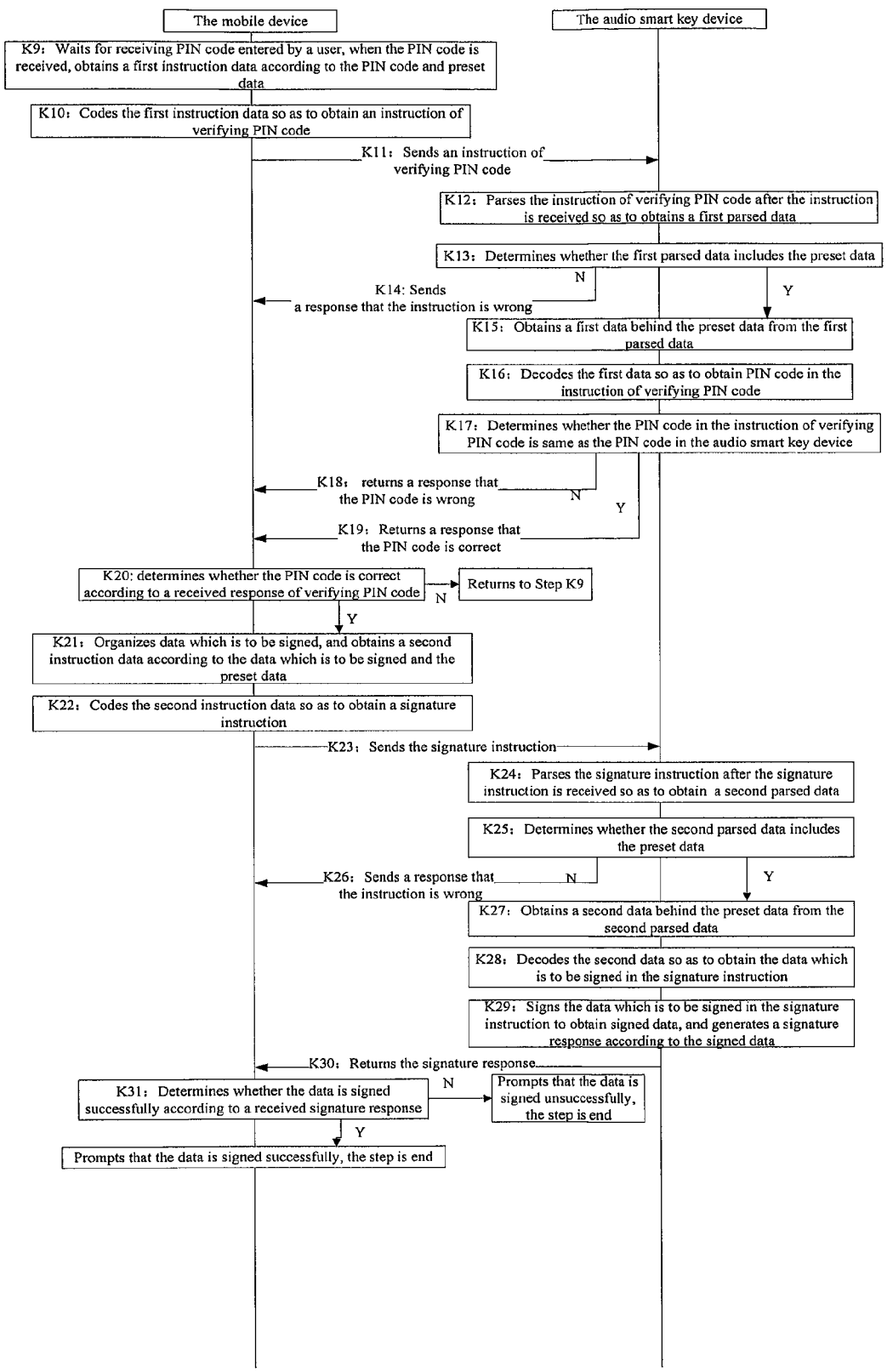

As shown in FIGS. 1-3, Embodiment 1 of the present invention provides a method for identifying an audio device, which includes:

Step S0, a mobile device starts a thread of monitoring pull out or insert of an audio device to monitor pull out or insert of the audio device, when that an audio device is pulled out is monitored by the mobile device, the mobile device turns down recording, the operation is end; when that an audio device is inserted is monitored by the mobile device, Step S1 is executed;

Step S1, the mobile device turns on recording;

In Embodiment 1, turning on recording specifically is that: the mobile device allocates a recording storage area, invokes a recording function, and introduces a head address of the recording storage area into the recording function, and turns on recording;

in which, the mobile device receives data according to a preset sampling frequency, a preset sampling size and a preset channel, and stores received data into the recording storage area.

In Embodiment 1, after the mobile device monitors that an audio device is inserted, the process further includes: the mobile device determines whether the audio device has a microphone, if yes, starts to record; otherwise, returns to monitor pull or insert of an audio device.

In Embodiment 1, after Step S1, the process further includes:

Step a1, the mobile device monitors a length of audio data received by the recording storage area at every preset duration, and determines whether the length reaches a first preset length, if yes, saves the received audio data of the first preset length, and executes Step S4; otherwise, executes Step a2;

in which, saving the received audio data specifically is: the received audio data is saved into a data storage area, and the received audio data is deleted from the recording storage area; in which, preferably, the received audio data of the first preset length in this step is all of the received audio data.

Preferably, the preset duration is 500 ms, and the first preset length is 512 bytes.

Step a2, the mobile device determines whether the time of recording reaches a first preset time, if yes, saves the audio data received by the recording storage area and executes Step S4; otherwise, returns to Step a1.

Preferably, the first preset time is 10 minutes.

In Embodiment 1, after Step S1, the process further includes:

Step b1, the mobile device monitors the length of the audio data received by the recording storage area every preset duration, and determines whether the length reaches the first preset length, if yes, executes Step b2; otherwise, executes Step b3;

Step b2, the mobile device saves the received audio data of the first preset length;

Step b3, the mobile device determines whether a length of the saved data reaches a second preset length, if yes, executes Step S4; otherwise, returns to Step b1.

in which, the second preset length is determined by the preset sampling frequency, the preset sampling size and the preset channel which are predetermined.

In Embodiment 1, after Step S1, the method further comprises:

Step c1, audio data received by the recording storage area is obtained by the mobile device every preset duration, and the received audio data is saved;

Step c2, the mobile device determines whether the recording time reaches the first preset time, if yes, execute Step S4; otherwise, execute Step c1.

In Embodiment 1, after Step S1, the process further includes:

Step d1, the mobile device monitors the length of the audio data received by the recording storage area at per preset duration, and determines whether the length reaches the first preset length, if yes, executes Step d2; otherwise, executes Step d3;

Step d2, the mobile device saves the received audio data of the first preset length; and Step d3, the mobile device determines whether the time of recording reaches the first preset time, if yes, executes Step S4; otherwise, executes Step d1.

Step S2, the audio smart key device powers on and initializes;

in which, Step S1 is executed by the mobile device, and Step S2 is executed by the audio smart key device, thus, Step S1 and Step S2 can be executed at the same time and there is no priority between the two steps.

In Embodiment 1, the audio smart key device powers on when the audio smart key device detects that it is connected with a mobile device; or the audio smart key device powers on when the Start key in the device is pressed.

Step S3, the audio smart key device sends audio data to the mobile device.

In Embodiment 1, Step S3 specifically is: the audio smart key device composes the preset number of data which is in a preset data form as a data package, codes the data package so as to obtain a coded data package, sends the coded data package to the mobile device according to the preset sampling frequency, the preset sampling size and the preset channel.

In Embodiment 1, Step S3 also may be: the audio smart key device obtains the preset data, codes the preset data so as to obtain a valid data segment; the preset number of data which is in the preset data form, buffering data and the valid data segment are composed as a data package; the data package is coded so as to obtain a coded data package which is sent to the mobile device according to the preset sampling frequency, the preset sampling size and the preset channel.

Step S4, the mobile device determines whether the audio data received in the first preset time is characteristic data, if yes, Step S6 is executed; otherwise, Step S5 is executed.

In Embodiment 1, preferably, the first preset time is 10 minutes.

In Embodiment 1, Step S4 specifically includes:

Step e1, the received audio data is parsed by the mobile device so as to obtain parsed data, whether there exists data which meets a preset data form in the parsed data is determined, if yes, Step e2 is executed; otherwise, the characteristic data is not received, the received data is cleared, and Step S5 is executed;

in which, that the received data is parsed so as to obtain the parsed data specifically is: the received audio data is filtered, blocked, low-pass filtered and transferred so as to obtain the parsed data.

Step e2, the mobile device determines whether the number of data which meets the preset data form reaches a preset number, if yes, the characteristic data is received, and Step S6 is executed; otherwise, the characteristic data is not received, and Step S5 is executed.

In Embodiment 1, when the number of data which meets the preset data form reaches the preset number, the step further includes:

Step g1, the mobile device obtains buffering data from the parsed data;

Step g2, the mobile device obtains a valid data segment from the parsed data according to the buffering data, and decodes the valid data segment so as to obtain decoded data; and Step g3, the mobile device determines whether the decoded data is the preset data, if yes, the characteristic data is received by the mobile device, and Step S6 is executed; otherwise, the characteristic data is not received by the mobile device, and Step S5 is executed.

In Embodiment 1, Step e1-e2 specifically include:

Step f1, the mobile device resets a current count value, and makes the first group of data in the parsed data as a current data group;

an initial value of the current count value is 0;

Step f2, the mobile device determines whether the current data group meets the preset data form, if yes, executes Step f3; otherwise, executes Step f4;

Step f3, the mobile device updates the current count value, and determines whether the current count value reaches a preset number, if yes, the characteristic data is received, and Step S6 is executed; otherwise, Step f4 is executed;

Step f4, the mobile device determines whether there exists unprocessed data group in the parsed data, if yes, a next data group of the current data group is made as a current data group, Step f2 is executed; otherwise, the characteristic data is not received, and the received data is cleared, and Step S5 is executed.

Step S5, the mobile device turns off recording, the process is ended;

Step S6, the mobile device identifies the audio device as an audio smart key device;

Step S7, the mobile device sends data to the audio smart key device;

Step S8, the audio smart key device determines whether data sent by the mobile device is received in a second preset time, if yes, Step S9 is executed; otherwise, the audio smart key device is turned off; and Step S9, the data sent by the mobile device is processed by the audio smart key device.

As shown in FIGS. 2-3, in Embodiment 1, Steps S7-S9 specifically include:

Step K1, a handshake instruction is generated by the mobile device according to handshake data stored in the mobile device;

Step K2, the mobile device sends the handshake instruction to the audio smart key device;

Step K3, the handshake instruction is parsed after the handshake instruction is received by the audio smart key device so as to the handshake data in the handshake instruction is obtained;

Step K4, the audio smart key device determines whether the handshake data stored in the audio smart key device matches the handshake data in the handshake instruction, if yes, executes Step K5; otherwise, executes Step K8;

Step K5, the audio smart key device generates a handshake response according to the handshake data stored in the audio smart key device;

Step K6, the handshake response is returned to the mobile device by the audio smart key device;

Step K7, the mobile device parses handshake data in the handshake response after the handshake response is received by the mobile device;

Step K8, the mobile device determines whether the handshake data in the handshake response matches the handshake data stored in the mobile device, if yes, executes Step K9; otherwise, the handshake is unsuccessful, the process is ended;

in which, when the mobile device determines that the handshake data in the handshake response matches the handshake data stored in the mobile device, the mobile device prompts that the handshake is successful; while the mobile device determines that the handshake data in the handshake response does not match the handshake data stored in the mobile device, the mobile device prompts that the handshake is unsuccessful.

Specifically, when the handshake data in the handshake response matches the handshake data stored in the mobile device, the mobile device identifies the audio device as an identifiable device of itself.

Step K9, the mobile device waits for receiving a PIN code entered by a user, when the PIN code is received, a first instruction data is obtained according to the PIN code and the preset data;

Step K10, the first instruction data is coded by the mobile device so as to obtain an instruction for verifying PIN code;

Step K11, the instruction of verifying PIN code is sent to the audio device by the mobile device;

Step K12, after the instruction of verifying PIN code is received by the audio smart key device, the instruction of verifying PIN code is parsed so as to obtain a first parsed data;

Step K13, the audio smart key device determines whether the preset data is included in the first parsed data, if yes, Step K15 is executed; otherwise, Step K14 is executed;

Step K14, a response of verifying PIN code that the instruction is wrong is sent to the mobile device by the audio smart key device, and Step K20 is executed;

Step K15, a first data after the preset data is obtained by the audio smart key device from the first parsed data;

Step K16, the first data is decoded by the audio smart key device so as to obtain the PIN code in the instruction of verifying PIN code;

Step K17, the audio smart key device determines whether the PIN code in the instruction of verifying PIN code is same as the PIN code stored in the audio smart key device, if yes, executes Step K19; otherwise, executes Step K18;

Step K18, a response of verifying PIN code that the PIN code is wrong is returned to the mobile device by the audio smart key device, and Step K20 is executed;

Step K19, a response of verifying PIN code that the PIN code is correct is returned to the mobile device by the audio smart key device, and Step K20 is executed;

Step K20, the mobile device determines whether the PIN code is correct according to the received response of verifying PIN code, if yes, executes Step K21; otherwise, returns to Step K9;

Step K21, data to be signed is organized by the mobile device, a second instruction data is obtained according to the data to be signed and the preset data.

In Embodiment 1, before Step K21, the process further includes: the mobile device waits for that the Enter key is pressed by a user, when the Enter key is pressed, the data to be signed is organized, and the data to be signed includes identity information of the user.

Step K22, the second instruction data is coded by the mobile device so as to obtain a signature instruction;

Step K23, the signature instruction is sent to the audio smart key device by the mobile device;

Step K24, the signature instruction is parsed by the audio smart key device after the signature instruction is received so as to obtain a second parsed data;

Step K25, the audio smart key device determines whether the second parsed data includes the preset data, if yes, executes Step K27; otherwise, executes Step K26;

Step K26, a signature response that the instruction is wrong is sent to the mobile device by the audio smart key device, and Step K31 is executed;

Step K27, a second data after the preset data is obtained by the audio smart key device from the second parsed data;

Step K28, the second data is decoded by the audio smart key device so as to obtain the data to be signed in the signature instruction;

Step K29, the audio smart key device signs the data which is to be signed in the signature instruction so as to obtain signed data, a signature response is generated according to the signed data.

In Embodiment 1, preferably, the audio smart key device applies a preset signature algorithm to sign the data which is to be signed in the signature instruction.

In Embodiment 1, between Step K28 and Step K29, the process further includes:

Step h1, the data which is to be signed is displayed by the audio smart key device; and Step h2, the audio smart key device determines whether the Enter key is pressed in a third preset time, if yes, Step K29 is executed; otherwise, a signature response of over time is returned to the mobile device.

Preferably, in Embodiment 1, the third preset time is 120 seconds.

Step K30, the signature response is returned to the mobile device by the audio smart key device; and Step K31, the mobile device determines whether the signature is successful according to the received signature response, if yes, prompts that the signature is successful, the process is end; otherwise, prompts that the signature is unsuccessful, and the process is ended.

Embodiment 2

Embodiment 2 of the present invention provides a method for identifying an audio device, which includes work flow of a mobile device and a work flow of an audio smart key device, the process in Embodiment 2 is that Steps a1-a2 are executed after Step S1 in Embodiment 1.

Figure 4:
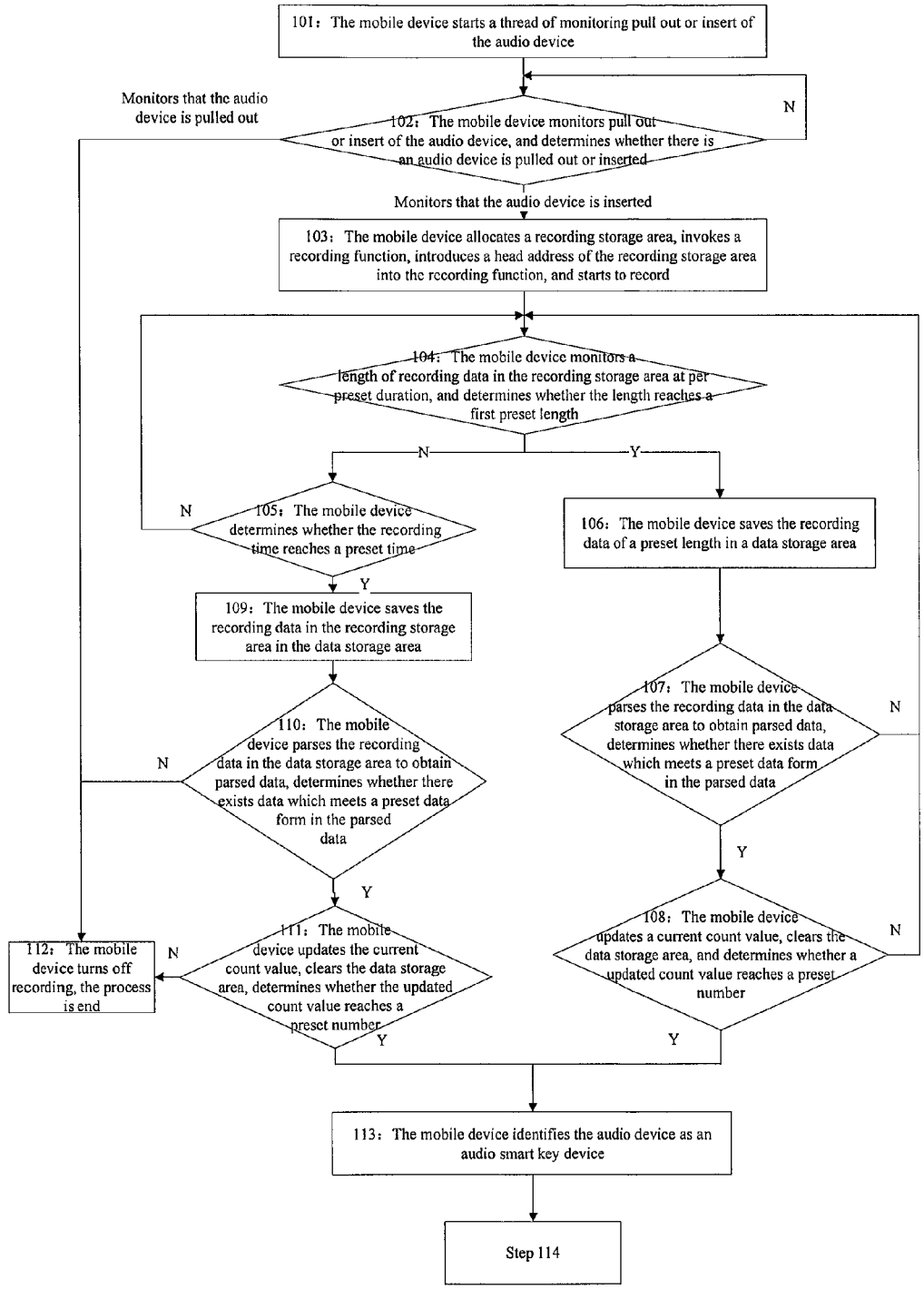
FIGS. 4 and 5 present an operation flow chart of a mobile device in a method of identifying an audio device according to Embodiment 2 of the present invention.
Figure 5:
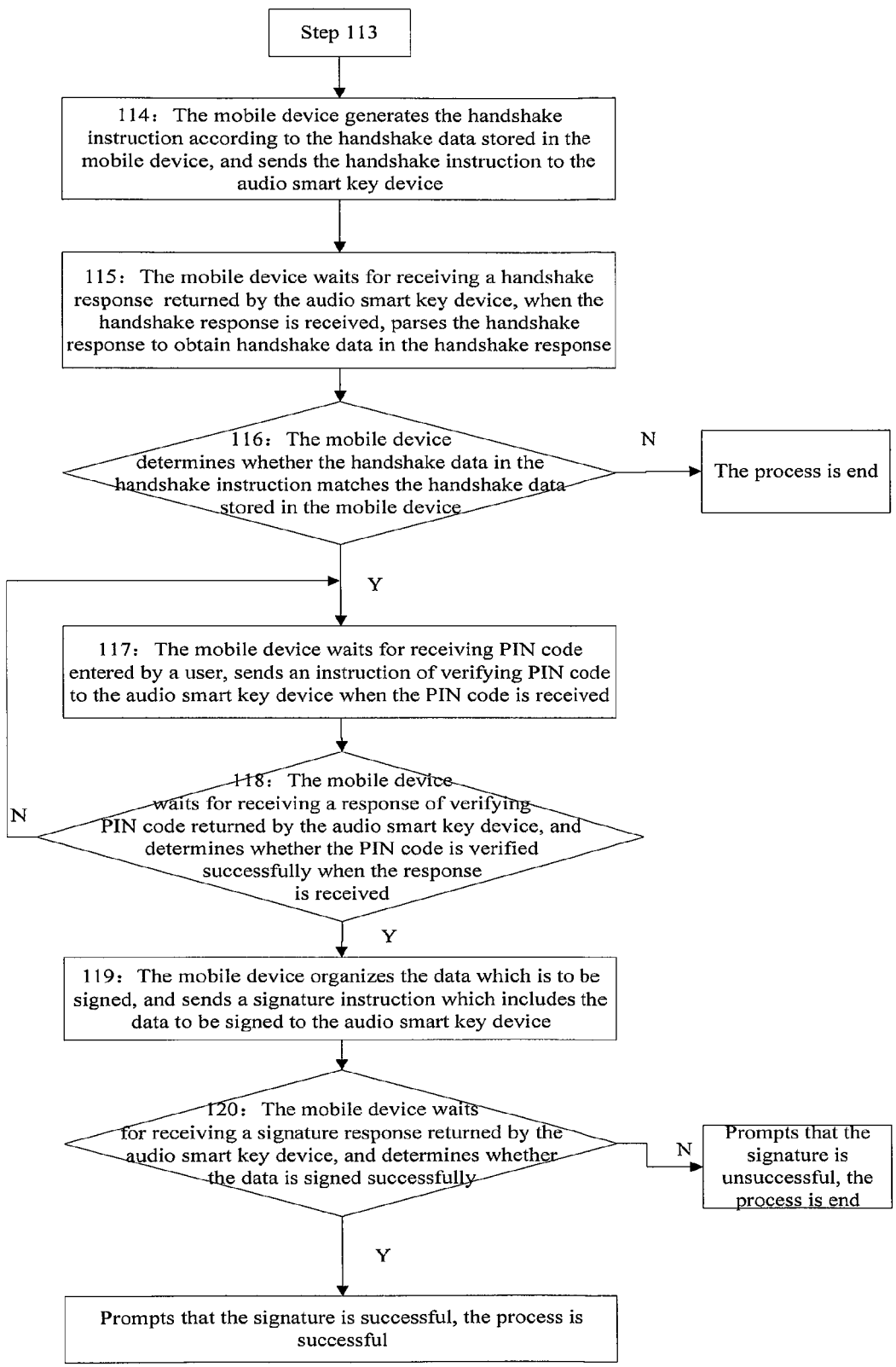

As shown in FIGS. 4-5, the mobile device executes following steps:

Step 101, the mobile device starts a thread of monitoring pull out or insert of an audio smart key device;

Step 102, the mobile device monitors pull out or insert of an audio device so as to determine whether there is an audio device is pulled out or inserted in the mobile device, executes Step 103 in the case that an audio device is inserted in the mobile device; executes Step 112 in the case that the audio device is pulled out; executes Step 102 in the case that no audio device is pulled out or inserted.

In Embodiment 2, monitoring pull out or insert of the audio device specifically includes: the mobile device monitors pull out or insert of the audio device by invoking a first system function which is isHeadsetPluggedIn( ).

In Embodiment 2, after the insert of the audio device is monitored, the process further includes: determine whether there exists a microphone in the audio device, if yes, execute Step 103; otherwise, return to Step 102; in which, determining whether there exists a microphone specifically is: detect whether the inserted audio device has a microphone by invoking a second system function, if yes, execute Step a4; otherwise, the audio device is an earphone, and pull out or insert of the audio device is monitored; if the insert audio device has an microphone, the audio device may be earphone key or an earphone with microphone, returns to monitor pull out or insert of the audio device.

Step 103, the mobile device allocates a recording storage area, invokes a recording function, introduces a head address of the recording storage area into the recording function, and turns on recording;

in which, after the head address of the recording storage area is introduced into the recording function, recording is turned on, the recording data is stored in the recording storage area.

In Embodiment 2, turning on recording specifically is that: the mobile device invokes the recording function in the operation system to turn on recording, and the recording data is received according to the preset sampling frequency, the preset sampling size and the preset channel.

for example, in a Windows operation system, a WAVEFORMATEX construction is structured, the sampling frequency 44100, the sampling size 16 bytes and the sound track which is single track are introduce in a waveInOpen function which is introduced in WAVEFORMATEX construction so as to obtain a HWAVEIN handle; a WAVEHDR construction is structured, a recording buffered address is introduced in waveInPrepareHeader function which is introduced in WAVEHDR construction for recording, waveInAddBuffer function is invoked to be introduce into the WAVEHDR construction to notice a recording device the recording buffered address, the waveInStart function is invoked to be introduced in the WAVEIN handle to record.

In an Android operation system, the recording is started by constructing AudioRecord object and invoking a read method of Audio Track class, in which, the introduced sampling frequency 44100, the sampling size is 16 bytes, the track is a single track, a read method of Audio Track class is invoked to start to record.

In an iOS operation system, a QueueState object is created, the sampling frequency 44100, the sampling size which is 16 bytes, and the track which is a single track are introduced in an Audio QueueNewInput function which is introduced in the QueueState object, an Audio QueueAllocateBuffer function is invoked to allocate the recording storage area, an Audio QueueEnqueueBuffer function is invoked to add buffer into a recording queue, an Audio QueueStart function is invoked and recording is started.

In a Windows Phone 7 operation system, a Microphone object is created, the sampling frequency 44100, the sampling size which is 16 bytes, and the track which is single track are introduced, a Start method of Microphone class is invoked to start to record.

Step 104, the mobile device monitors a length of the recording data in the recording storage area at per preset duration, determines whether the length reaches the first preset length, if yes, executes Step 106; otherwise, executes Step 105.

Preferably, the preset length is 512 bytes, the preset length is 500 ms; preferably, in the present Embodiment 2, the recording data of the first preset length is a part of the received audio data.

Step 105, the mobile device determines whether the recording time reaches the first preset time, if yes, executes Step 109; otherwise, executes Step 104.

Preferably, the first preset time is 10 minutes.

Step 106, the mobile device saves the recording data of a preset length in the data storage area.

Specifically, recording data of a preset length is saved in the data storage area, and the recording data of a preset length in the preset storage area is deleted.

Step 107, the mobile device parses the recording data in the data storage area so as to obtain parsed data, whether there exists data which meets a preset data form in the parsed data, if yes, Step 108 is executed; otherwise, Step 104 is executed.

In Embodiment 2, parsing the recording data in the data storage area so as to obtain parsed data specifically is: the audio data is filtered, blocked, low-pass filtered and transferred so as to obtain the parsed data.

For example, in Embodiment 2, the audio data is parsed so as to obtain the parsed data which is:
{5355 5355 5355-5356-5356-5356}
{5355 5355 5355-5356-5356-5356}
{5355 5355 5355-5356-5356-5356}
{5355 5355 5355-5356-5356-5356}
{5355 5355 5355-5356-5356-5356}
{5355 5355 5355-5356-5356-5356} . . .
{5355 5355 53555355 5355 5355-5356-5356-5356-5356-5356-5356}
{5355 5355 53555355 5355 5355-5356-5356-5356-5356-5356-5356}
{5355 5355 53555355 5355 5355-5356-5356-5356-5356-5356-5356}
{5355 5355 53555355 5355 5355-5356-5356-5356-5356-5356-5356}
{5355 5355 53555355 5355 5355-5356-5356-5356-5356-5356-5356}
{5355 5355 53555355 5355 5355-5356-5356-5356-5356-5356-5356}
{5355 5355 53555355 5355 5355-5356-5356-5356-5356-5356-5356}
{5355 5355 53555355 5355 5355-5356-5356-5356-5356-5356-5356}
{5355 5355 53555355 5355 5355-5356-5356-5356-5356-5356-5356}
{5355 5355 5355-5356-5356-5356}
{5355 5355 5355-5356-5356-5356}
{5355 5355 5355-5356-5356-5356}
{5355 5355 5355-5356-5356-5356}

{5355 5355 5355-5356-5356-5356}
{5355 5355 5355-5356-5356-5356}
{5355 5355 5355-5356-5356-5356}
{5355 5355 5355-5356-5356-5356}

Step 108, the mobile device updates a current count value, clear the data storage area, and determines whether an updated current value reaches a preset number, if yes, executes Step 113; otherwise, returns to Step 104.

Figure 6:
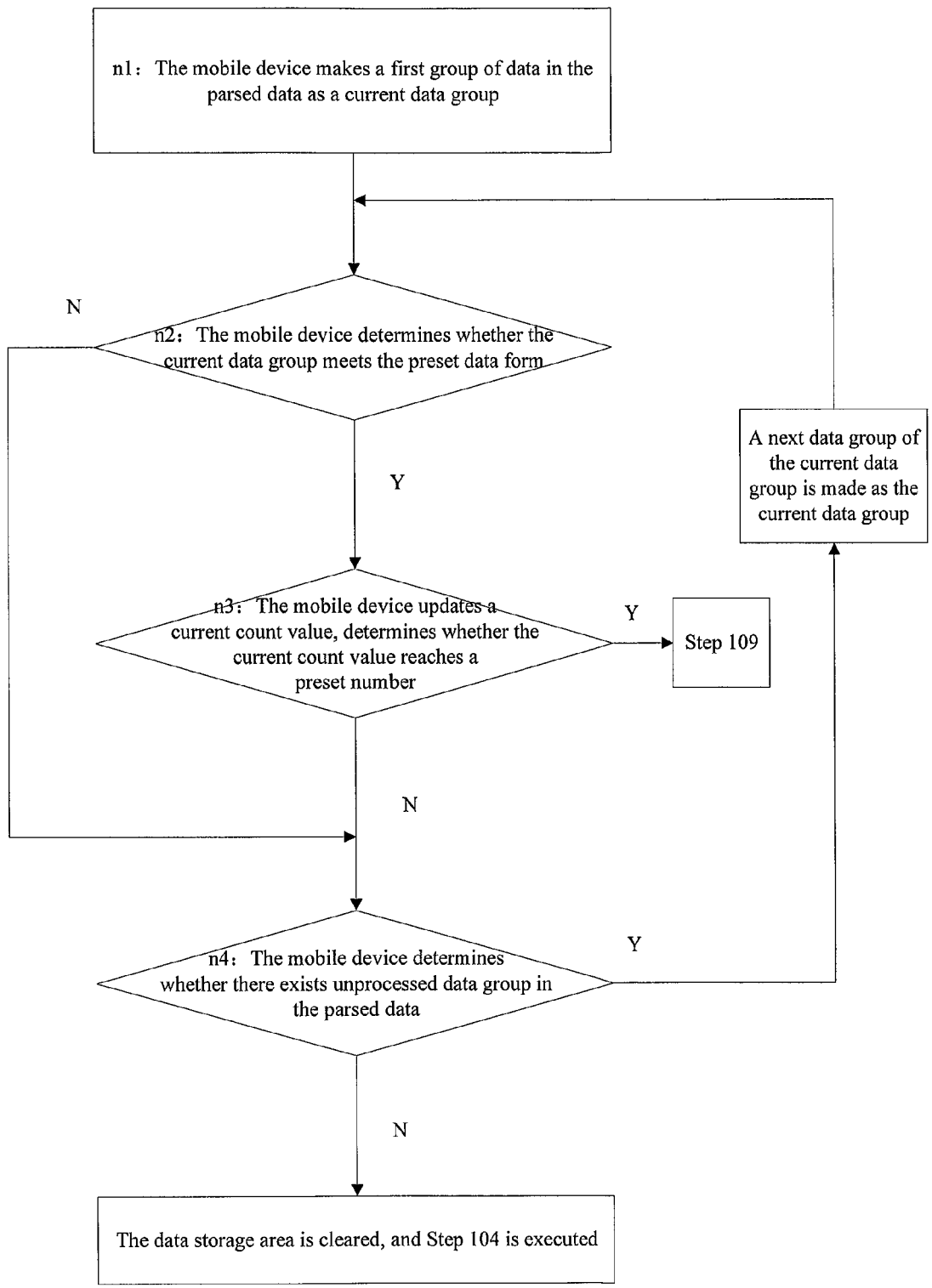
FIG. 6 is details of Step 107 and Step 108 in Embodiment 2.

As shown in FIG. 6, in Embodiment 2, Step 107-108 specifically includes:

Step n1, the first group of data in the parsed data is made as a current data group by the mobile device;

Step n2, the mobile device determines whether the current data group meets the preset form, if yes, executes Step n3; otherwise, executes Step n4.

In Embodiment 2, preferably, the preset data form is a group of data which consecutively consist of three positives and three negatives;

Step n3, the mobile device updates the current count value, and determines whether the current count value reaches the preset number, if yes, executes Step 109; otherwise, executes Step n4.

In Embodiment 2, preferably, the characteristic data is included in the recording data in the case that the current count value reaches the preset number which is 30; a next data group is obtained in the case that the current count value dose not reaches the preset number which is 30 until the count value reaches 30; if the current data group is the last group of the recording data and the current count value dose not reach the preset number, the characteristic data is not included in the recording data.

In Embodiment 2, if the characteristic data is not included in the recording data, there are two possibilities: in one case, there is an error in the process of receiving the recording data, it is impossible to determine whether the audio device is an audio smart key device; in the other case, the recording data is not sent by the audio smart key device.

Step n4, the mobile device determines whether there exists unprocessed data group in the parsed data, if yes, a next data group of the current data group is made as a current data group, and Step n2 is executed; otherwise, the data storage area is cleared, and Step 104 is executed.

For example, in Embodiment 2, the characteristic data in the parsed data is:
{5355 5355 5355-5356-5356-5356}
{5355 5355 5355-5356-5356-5356}
{5355 5355 5355-5356-5356-5356}
{5355 5355 5355-5356-5356-5356}
{5355 5355 5355-5356-5356-5356}
{5355 5355 5355-5356-5356-5356} . . .

Step 109, the mobile device saves the recording data in the recording storage area into the data storage area;

Step 110, the mobile device parses the recording data in the data storage so as to obtain parsed data, determines whether there exists data which meets the preset data form in the parsed data, if yes, executes Step 111; otherwise, executes Step 112;

Step 111, the mobile device updates the count value, clears the data storage area, determines whether the updated current count value reaches the preset number, if yes, executes Step 113; otherwise, executes Step 112.

In Embodiment 2, when the updated current count value reaches the preset number in Step 111, the process further includes:

Step 1, the mobile device obtains buffering data behind the characteristic data from the parsed data.

In Embodiment 2, the buffering data is data of the preset length after the characteristic data; it is not known that the data after the characteristic data is the characteristic data or the valid data, thus, the buffering data of the preset length is set behind the characteristic data, and behind the buffering data is the valid data.

For example, in Embodiment 2, the buffering data behind the characteristic data is:
{5355 5355 53555355 5355 5355-5356-5356-5356-5356-5356-5356}
{5355 5355 53555355 5355 5355-5356-5356-5356-5356-5356-5356}

Step 2, the mobile device obtains a valid data segment behind the buffering data from the parsed data, decodes the valid data segment so as to obtain coded data.

For example, in Embodiment 2, decoding the valid data specifically is: consecutive six positives and six negatives in each data group are decoded as 1, consecutive three positives and three negatives are decoded as 0, thus the decoded data is 1111 1111 0000 0000.

Step 3, the mobile device determines whether the decoded data is the preset data, if yes, executes Step a7; otherwise, returns to Step a4.

Preferably, the preset data is 0XFF 0X00.

For example, in Embodiment 2, if the decoded data is same as the preset data, the received audio data is sent by the earphone key.

Step 112, the mobile device turns off recording, the process is end;

Step 113, the mobile device identifies the audio device as the audio smart key device;

Step 114, the mobile device generates a handshake instruction according to handshake data stored in the mobile device, and sends the handshake instruction to the audio smart key device;

Step 115, the mobile device waits for receiving a handshake response returned by the audio smart key device, when the handshake response is received, the handshake response is parsed so as to obtain the handshake data in the handshake response;

Step 116, the mobile device determines whether the handshake data in the handshake instruction matches the handshake data stored in the mobile device, if yes, executes Step 117; otherwise, the process is end;

Step 116 further includes: when the handshake data in the handshake instruction matches the handshake data stored in the mobile device, the handshake is successful; otherwise, the handshake is unsuccessful;

Step 117, the mobile device waits for PIN code entered by a user, when the PIN code is received, an instruction of verifying PIN code is sent to the audio smart key device; and when the PIN code entered by the user is received, Step 117 further includes: the mobile device obtains the first instruction data according to the PIN code entered from the user and preset data, decodes the first instruction data so as to obtain the instruction of verifying PIN code;

Step 118, the mobile device waits for receiving a response of verifying PIN code returned by the audio smart key device, when the response of verifying PIN code is received, determines whether the PIN code is verified successfully, if yes, executes Step 119; otherwise, executes Step 117.

Step 118 further includes: when the PIN code is verified successfully, prompts that the PIN code is verified successfully.

In Embodiment 2, before returning to Step 117, the process further includes: determine whether times of verifying PIN code reaches a preset value, if yes, the process is end; otherwise, return to Step 117.

Step 119, the mobile device organizes data which is to be signed, sends a signature instruction which includes the data to be signed to the audio smart key device;

Step 119 further includes: the mobile device obtains the second instruction data according to the data which is to be signed and the preset data, decodes the second instruction data so as to obtain the signature instruction;

Specifically, the mobile device waits that Enter key in the mobile device is pressed by a user, when the Enter key is pressed, the mobile device organizes the data to be signed according to the user's identity information.

Step 120, the mobile device waits for receiving a signature response returned by the audio smart key device, and determines whether the signature is successful, if yes, prompts that the signature is successful; otherwise, prompts that the signature is unsuccessful, and the process is end.

Figure 7:
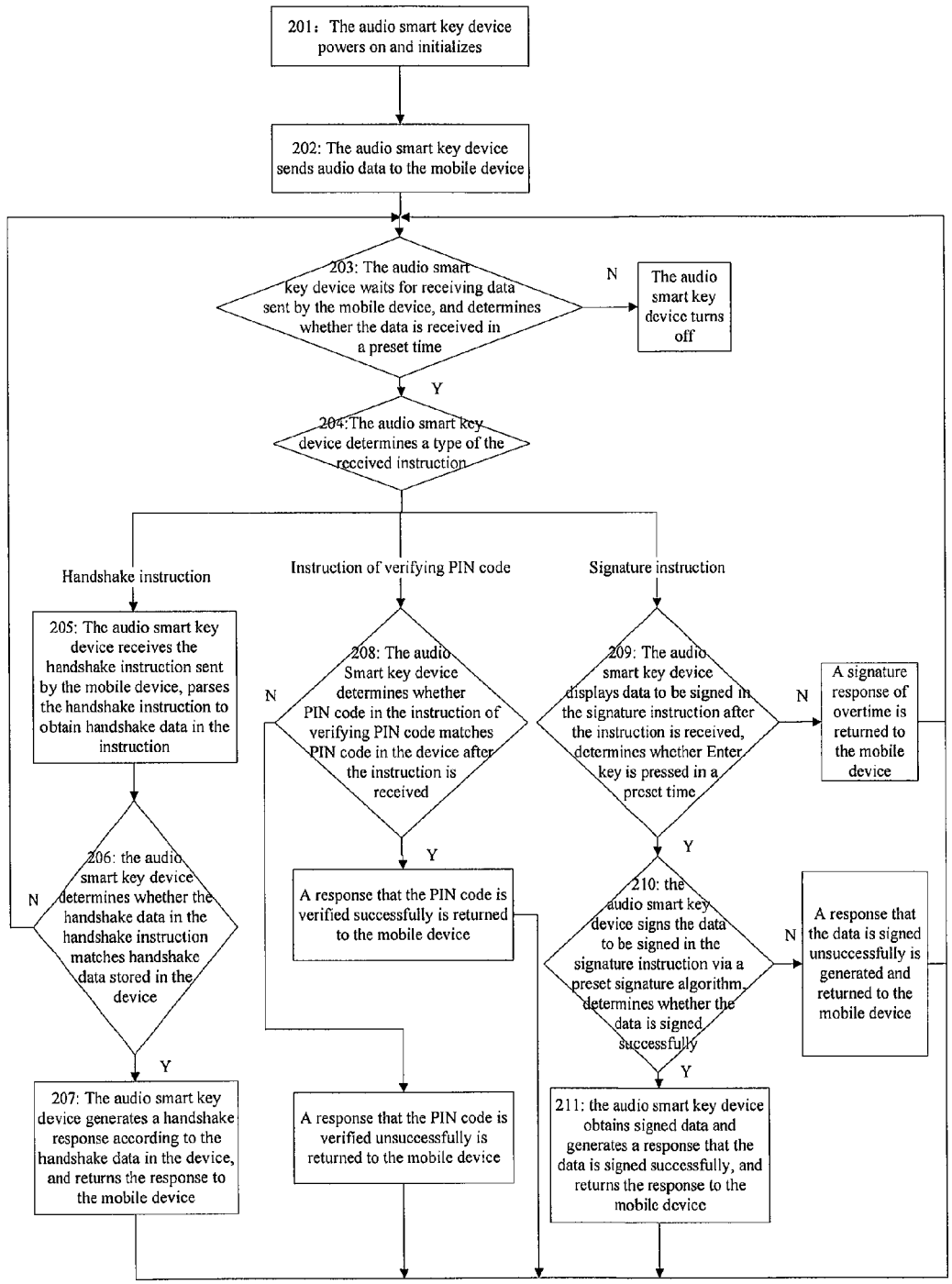
FIG. 7 is an operation flow chart of an audio smart key device in a method of identifying an audio device.

As shown in FIG. 7, the audio smart key executes following steps:

Step 201, the audio smart key device is powered on and initialized; Specifically, when the audio smart key device detects it is connected with a mobile device, the audio smart key device is powered on; or when the Start key in the audio smart key device is pressed, the audio smart key device is powered on;

Step 202, the audio smart key device sends audio data to the mobile device;

Specifically, the audio smart key device obtains the preset data, codes the preset data so as to obtain a valid data segment; composes a preset number of data which is in a preset data form, buffering data and the valid data segment to a data package; codes the data package so as to obtain a coded data package, and the coded data package is sent to the mobile device via an audio interface according to the preset sampling frequency, the preset sampling size and the preset channel;

Step 203, the audio smart key device waits for receiving data sent by the mobile device, determines whether the data sent by the mobile device is received in the second preset time, if yes, executes Step 204; otherwise, the audio smart key device is turned off;

Step 204, the audio smart key device determines a type of the received instruction, executes Step 205 in the case that the instruction is a handshake instruction; executes Step 208 in the case that the instruction is an instruction of verifying PIN code; executes Step 209 in the case that the instruction is a signature instruction;

Step 205, the audio smart key device receives the handshake instruction sent by the mobile device, parses the handshake instruction so as to obtain the handshake data in the handshake instruction;

Step 206, the audio smart key device determines whether the handshake data in the handshake instruction matches the handshake data saved in the audio device, if yes, executes Step 207; otherwise, returns to Step 203;

Step 207, the audio smart key device generates a handshake response according to the handshake data stored in the audio device, the handshake response is returned to the mobile device, and Step 203 is returned to;

Step 208, the audio smart key device determines whether PIN code in the instruction of verifying PIN code matches PIN code in the audio device after the instruction of verifying PIN code sent by the mobile device is received by the audio smart key device, if yes, returns the response that the PIN code is verified successfully to the mobile device, and returns to Step 203; otherwise, returns the response that the PIN code is verified unsuccessfully to the mobile device, and returns to Step 203.

Step 208 further includes: the audio smart key device parses the instruction of verifying PIN code so as to obtain a first parsed data, determines whether the first parsed data includes the preset data, if yes, a first data behind the preset data is obtained from the first parsed data, and the first data is decoded so as to obtain PIN code in the instruction of verifying PIN code; otherwise, a response that the instruction is wrong is sent to the mobile device;

Step 209, the audio smart key device displays the data to be signed in the signature instruction after the signature instruction sent by the mobile device is received by the audio smart key device, and determines whether Enter key is pressed in a preset time, if yes, executes Step 210; otherwise, returns a signature response of overtime to the mobile device, and returns to Step 203;

Step 210, the audio smart key device applies the preset signature algorithm to sign the data which is to be signed in the signature instruction, and determines whether the audio smart key device can sign the data successfully, if yes, executes Step 211; otherwise, generates a signature response that the audio smart key device signs the data unsuccessfully, and returns the response to the mobile device, and returns to Step 203;

Step 210 further includes that: the audio smart key device parses the signature instruction so as to obtain the second parsed data, and determines whether the second parsed data includes the preset data, if yes, obtains a second data behind the preset data from the second parsed data, decodes the second data so as to obtain the data which is to be signed in the signature instruction; otherwise, sends a signature response that the instruction is wrong to the mobile device;

Step 211, the audio smart key device obtains signed data, generates a signature response that the signature is successful according to the signed data, and returns the signature response to the mobile device, and returns to Step 203.

In Embodiment 2, being controlled by itself, the mobile device cannot send data to the audio device actively, thus, noises in an earphone because of data is sent by the mobile device to the audio device can be prevented when the earphone is inserted in the mobile device.

While the preferred Embodiments of the present invention have been shown and described herein, it will be obvious for those skilled in the art that such Embodiments are provided by way of examples only. Any changes and substitutions will be covered by the scope of protection of the present invention. It is intended that the appended claims define the scope of protection of the present invention.

The invention claimed is:

1. A method for identifying an audio device, which is applied for a system including a mobile device and an audio device, wherein the method comprises:
   starting, by the mobile device, a thread of monitoring any pulling out or inserting of an audio device so as to monitor pulling out or inserting of the audio device;
   when the mobile device connects the audio device, the mobile device operates the following steps:
   Step S1, starting, by the mobile device, to record when the mobile device monitors that the audio device is inserted into the mobile device;
   Step S2, determining, by the mobile device, whether audio data received in a first preset time is characteristic data, if yes, executing Step S4; if no, executing Step S3;

Step S3, turning off, by the mobile device, recording, ending;

Step S4, identifying, by the mobile device, the inserted audio device as an audio smart key device; and Step S5, sending, by the mobile device, data to the audio smart key device;

when the audio smart key device connects the mobile device, the audio smart key device executes the following steps:

Step T1, powering on and initializing by the audio smart key device;

Step T2, sending, by the audio smart key device, audio data to the mobile device;

Step T3, determining, by the audio smart key device, whether data sent by the mobile device is received in a second preset time, if yes, executing Step T4; if no, turning off the audio smart key device; and Step T4, processing, by the audio smart key device, the data sent by the mobile device;

when the mobile device monitors that the audio device is pulled out, turning off the recording, ending the mobile device; then turning off the audio device.

2. The method as claimed in claim 1, wherein, Step S1 specifically comprises: allocating, by the mobile device, a recording storage area, invoking a recording function, introducing a head address in the recording storage area into the recording function, and starting to record.

3. The method as claimed in claim 2, wherein, after Step S1, the method further comprises:

Step a1, monitoring, by the mobile device, a length of the audio data received by the recording storage area every preset duration, and determining whether the length reaches a first preset length, if yes, saving the received audio data of the first preset length, and executing Step S2; otherwise, executing Step a2;

Step a2, determining, by the mobile device, whether the recording time reaches the first preset time, if yes, saving the received audio data in the recording storage area, and executing Step S2; otherwise, returning to Step a1.

4. The method as claimed in claim 2, wherein, after Step S1, the method further comprises:

Step b1, monitoring, by the mobile device, the length of the audio data received by the recording storage area every preset duration, and determining whether the length reaches the first preset length, if yes, executing Step b2; otherwise, executing Step b3;

Step b2, saving, by the mobile device, the received audio data of the first preset length;

Step b3, determining, by the mobile device, whether a length of the received audio data which is saved reaches a second preset length, if yes, executing Step S2; otherwise, returning to Step b1.

5. The method as claimed in claim 2, wherein, after Step S1, the method further comprises:

Step c1, obtaining, by the mobile device, audio data received by the recording storage area every preset duration, and saving the received audio data;

Step c2, determining, by the mobile device, whether the recording time reaches the first preset time, if yes, executing Step S2; otherwise, executing Step c1.

6. The method as claimed in claim 2, wherein, after Step S1, the method further comprises:

Step d1, monitoring, by the mobile device, the length of the audio data received by the recording storage area every preset duration, and determining whether the length reaches the first preset length, if yes, executing Step d2; otherwise, executing Step d3;

Step d2, saving, by the mobile device, the received audio data of the first preset length; and Step d3, determining, by the mobile device, whether the recording time reaches the first preset time, if yes, executing Step S2; otherwise, executing Step d1.

7. The method as claimed in claim 1, wherein, Step S2 specifically comprises:

Step e1, parsing, by the mobile device, the received audio data so as to obtain parsed data, determining whether there exists data which meets a preset data form in the parsed data, if yes, executing Step e2; otherwise, clearing the received data in the case that the characteristic data is not received, and executing Step S3;

Step e2, determining, by the mobile device, whether the number of data which meets the preset data form reaches a preset number, if yes, executing Step S4 when the characteristic data is received; otherwise, executing Step S3 when the characteristic data is not received.

8. The method as claimed in claim 7, wherein, Step e1 and Step e2 specifically comprise:

Step f1, resetting, by the mobile device, a current count value, and making a first group of data in the parsed data as a current data group;

Step f2, determining, by the mobile device, whether the current data group meets the preset data form, if yes, executing Step f3; otherwise, executing Step f4;

Step f3, updating, by the mobile device, the current count value, determining whether the current count value reaches the preset number, if yes, receiving the characteristic data, executing Step S4; otherwise, executing Step f4; and Step f4, determining, by the mobile device, whether there exists unprocessed data group in the parsed data, if yes, making the next data group as a current data group, and executing Step f2; otherwise, clearing the received data when the characteristic data is not received, and executing Step S3.

9. The method as claimed in claim 7, wherein, in Step e2, when the number of data which meets the preset data form reaches the preset number, the method further comprises:

Step g1, obtaining, by the mobile device, buffering data from the parsed data;

Step g2, obtaining, by the mobile device, a valid data segment from the parsed data according to the buffering data, and decoding the valid data segment so as to obtain a decoded data; and Step g3, determining, by the mobile device, whether the decoded data is preset data, if yes, the mobile device receives the characteristic data, and executes Step S4; otherwise, the mobile device does not receive the characteristic data, and executes Step S3.

10. The method as claimed in claim 1, wherein, in Step T1, powering on the audio smart key device specifically comprises: powering on the audio smart key device when the audio smart key device detects it connects to the mobile device; or in Step T1, powering on the audio smart key device specifically comprises: powering on the audio smart key device when the Start key in the audio smart key device is pressed.

11. The method as claimed in claim 1, wherein, Step T2 specifically comprises: composing, by the audio smart key device, the preset number of data of the preset data form as a data package, coding the data package so as to obtain a coded data package, and sending the coded data package to the mobile device via an audio interface according to a preset sampling frequency, a preset sampling size and a preset channel.

12. The method as claimed in claim 1, wherein, Step T2 specifically comprises: obtaining, by the audio smart key device, the preset data, coding the preset data so as to obtain a valid data segment; composing the preset number of data of the preset data form, buffering data and the valid data segment as a data package; coding the data package so as to obtain a coded data package, and sending the coded data package to the mobile device according to the preset sampling frequency, the preset sampling size and the preset channel via an audio interface.

13. The method as claimed in claim 1, wherein, Step S5 specifically comprises:
Step h1, generating, by the mobile device, a handshake instruction according to handshake data stored in the mobile device, and sending the handshake instruction to the audio smart key device;
Step h2, waiting for, by the mobile device, receiving a handshake response returned from the audio smart key device, parsing the handshake response when the handshake response is received so as to obtain handshake data in the handshake response;
Step h3, determining, by the mobile device, whether the handshake data in the handshake instruction matches with the handshake data stored in the mobile device, if yes, the handshake is successful; otherwise, the handshake is unsuccessful,
Step T4 specifically comprises:
Step i1, receiving, by the audio smart key device, the handshake instruction sent from the mobile device, and parsing the handshake instruction so as to obtain handshake data in the handshake instruction;
Step i2, determining, by the audio smart key device, whether the handshake data in the handshake instruction matches with the handshake data stored in the audio device, if yes, executing Step i3; otherwise, returning to execute Step T3; and
Step i3, generating, by the audio smart key device, a handshake response according to the handshake data stored in the audio device, and returning the handshake response to the mobile device.

14. The method as claimed in claim 1, wherein, Step T5 further comprises:
Step j1, waiting, by the mobile device, for receiving PIN code entered by a user, obtaining, by the mobile device, a first instruction data when the PIN code entered by the user is received according to the PIN code entered by the user and preset data, coding the first instruction data so as to obtain the instruction for verifying PIN code, and sending the instruction for verifying PIN code to the audio smart key device;
Step j2, waiting for, by the mobile device, receiving a response of verifying PIN code returned from the audio smart key device, determining whether the PIN code is verified successfully when the response of verifying PIN code is received, if yes, prompting that the PIN code is verified successfully; otherwise, returning to Step j1.

15. The method as claimed in claim 1, wherein, Step S5 further comprises:
Step k1, organizing, by the mobile device, data which is to be signed, and obtaining a second instruction data according to the data which is to be signed and the preset data, coding the second instruction data so as to obtain the signature instruction; and Step k2, waiting for, by the mobile device, receiving a signature response returned from the audio smart key device, and determining whether the signature is successful, if yes, prompting that the signature is successful; otherwise, prompting that the signature is unsuccessful,
Step T4 further comprises: applying, by the audio smart key device, a preset signature algorithm to sign the data to be signed in the signature instruction after the audio smart key device receives the signature instruction sent from the mobile device, determining whether the audio smart key device can sign the data successfully, if yes, obtaining signed data, and generating a signature response that the audio smart key device signs the data successfully according to the signed data, and returning the successful signature response to the mobile device; otherwise, generating a signature response that the audio smart key device signs the data unsuccessfully, and returning the unsuccessful signature response to the mobile device.

16. The method as claimed in claim 14, wherein, Step T4 further comprises: determining, by the audio smart key device, whether the PIN code in the instruction for verifying PIN code matches with the PIN code stored in the audio smart key device after an instruction for verifying PIN code sent from the mobile device is received by the audio smart key device, if yes, returning a response that the PIN code is verified successfully to the mobile device, and returning to Step T3; otherwise, returning a response that the PIN code is verified unsuccessfully to the mobile device, and returning to Step T3; in which, when the instruction for verifying PIN code sent from the mobile device is received, Step T4 further comprises: parsing, by the audio smart key device, the instruction for verifying PIN code so as to obtain a first parsed data, determining whether the first parsed data includes the preset data, if yes, obtaining a first data behind the preset data from the first parsed data, and decoding the first data so as to obtain the PIN code in the instruction for verifying PIN code; otherwise, sending a response for verifying PIN code that the instruction is wrong to the mobile device.

17. The method as claimed in claim 15, wherein, organizing the data which is to be signed specifically comprises: waiting for, by the mobile device, a user to press the Enter key, and organizing the data which is to be signed according to the user's identity information when the Enter key is pressed.

18. The method as claimed in claim 15, wherein, after the signature instruction sent from the mobile device is received, the method further comprises: parsing, by the audio smart key device, the signature instruction so as to obtain a second parsed data, determining whether the second parsed data includes the preset data, if yes, obtaining a second data behind the preset data from the second parsed data, and decoding the second data so as to obtain the data to be signed in the signature instruction; otherwise, sending a signature response that the instruction is wrong to the mobile device.

19. The method as claimed in claim 15, wherein, after the audio device receives the signature instruction, Step k5 further comprises: displaying, by the audio smart key device, the data which is to be signed, and determining whether the Enter key is pressed in a third preset time, if yes, applying the preset signature algorithm to sign the data to be signed in the signature instruction; otherwise, returning a signature response of time-out to the mobile device.

20. The method as claimed in claim 1, wherein, after the mobile device monitors that an audio device is inserted into it, the method further comprises: determining, by the mobile device, whether there exists a microphone in the audio device, if yes, starting to record; otherwise, going on monitoring the pull out or insert of an audio device.

\* \* \* \* \*